(12) United States Patent
Chan et al.

(10) Patent No.: US 7,590,290 B2
(45) Date of Patent: Sep. 15, 2009

(54) FAIL SAFE IMAGE PROCESSING APPARATUS

(75) Inventors: Woei Chan, Darlinghurst (AU); Andrew James Dorrell, East Blaxland (AU)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 11/184,923

(22) Filed: Jul. 20, 2005

(65) Prior Publication Data

US 2006/0038894 A1 Feb. 23, 2006

(30) Foreign Application Priority Data

Jul. 21, 2004 (AU) .............................. 2004904025

(51) Int. Cl.
*G06K 9/68* (2006.01)
(52) U.S. Cl. .................... 382/218; 382/275; 348/36; 348/231.6; 345/426
(58) Field of Classification Search ............... 382/218, 382/110, 284, 154, 104, 294, 275; 348/231.6, 348/148, 241, E5.042, 552, 36, E13.058, 348/E5.051, E5.034, E5.045, E13.014, E13.016, 348/383, 744, E5.139, E5.144; 345/426, 345/473, 419; 353/122, 94, 121; 235/379; 340/937; 705/43, 45
See application file for complete search history.

(56) References Cited

U.S. PATENT DOCUMENTS

| | | | |
|---|---|---|---|
| 4,692,759 A | 9/1987 | Phan Van Cang | |
| 5,266,983 A | 11/1993 | Takagi | ........................ 354/412 |
| 5,682,197 A * | 10/1997 | Moghadam et al. | ........... 348/36 |
| 5,764,306 A | 6/1998 | Steffano | |
| 5,805,213 A | 9/1998 | Spaulding et al. | |
| 5,828,793 A | 10/1998 | Mann | |
| 6,317,192 B1 | 11/2001 | Silverbrook et al. | |
| 6,636,635 B2 | 10/2003 | Matsugu | |
| 2002/0180973 A1 | 12/2002 | MacKinnon et al. | |

FOREIGN PATENT DOCUMENTS

| | | |
|---|---|---|
| KR | 2004-0036807 | 5/2004 |
| WO | WO 99/65223 | 12/1999 |

OTHER PUBLICATIONS

Nakamae et al., "Computer Generated Still Images Composited With Panned Landscape Video Sequences", Multi-media modelling, MMM '98 Proceedings Oct. 12-15, 1998.
Singla et al., "Video Composition and Retrieval" Multi-media and Expo, 2000 ICME 2000 IEEE International, published on-line, Aug. 6, 2000.
Examiner's Report dated May 21, 2007 in corresponding Australian patent application No. 2005203158.

* cited by examiner

*Primary Examiner*—Sheela C Chawan
(74) *Attorney, Agent, or Firm*—Fitzpatrick, Cella, Harper & Scinto (57) ABSTRACT

Methods of capturing image pixel data representing a scene may be practiced using a camera and may be implemented as software, such as an application program executing within the camera. The methods are particularly advantageous where user modification to the camera control parameters leads to a difference between the values of the pre-capture control parameters for the camera when compared to the pre-capture control parameters that the camera would determine in fully automatic mode. The measured difference may be compared to one or more predetermined threshold values.

21 Claims, 5 Drawing Sheets

FAIL SAFE IMAGE PROCESSING APPARATUS

CROSS-REFERENCE TO RELATED PATENT APPLICATIONS

This application claims the right of priority under 35 U.S.C. § 119 based on Australian Patent Application No. 2004904025, filed 21 Jul. 2004, which is incorporated by reference herein in its entirety as if fully set forth herein.

FIELD OF THE INVENTION

The present invention relates generally to the field of digital photography and, in particular, to a method and apparatus for capturing image pixel data representing a scene. The present invention also relates to a computer program product including a computer readable medium having recorded thereon a computer program for capturing image pixel data representing a scene.

BACKGROUND

Digital cameras are becoming increasingly popular for generating still or video images of a scene. Such cameras have introduced an increased level of sophistication and capability to the field of photography. Currently even entry-level digital cameras include a plethora of possible settings for camera control parameters and options designed for capturing images in different photographic conditions.

Many modern digital cameras automatically configure the control parameters of the camera in order to capture an image in certain photographic conditions (e.g., light, dark, sunny day, cloudy day). However, it is often possible to obtain an improved image, or to obtain a particular creative effect, by using different control parameters to those that the camera has automatically configured. For this reason, many cameras provide means for a user to adjust the control parameters of the camera. This may include means for adjusting image storage format, aperture size, ISO sensitivity, white balance, exposure compensation, and turning on/off an electronic flash, for example.

Some more sophisticated digital cameras allow for the selection of a focus point, an exposure compensation value, ISO sensitivity, a meter weighting method for exposure control, exposure or focus bracketing, an image storage format and more. Other digital cameras include means for setting a photographic mode (e.g., portrait or landscape) such that selection of a mode results in the automatic selection of control parameters to suit the selected mode.

Typically, once control parameters such as white balance or mode are adjusted manually to particular settings, the settings are retained so that a user does not have to make the adjustment again with each shot. However, due to the number of control parameters that may be adjusted and the spontaneous nature of photography, it is possible, and in fact quite common, for an incorrect control parameter setting to be carried over from a previous photographic session. Further, due to the large number and complex interdependency of control parameters, it is not uncommon for a user to make a sub-optimal control parameter selection when making creative modifications to the control parameter settings of a camera. Often the user is unaware of such a sub-optimal control parameter selection until after an image has been captured. In many cases it is impossible to re-shoot the image with correct control parameter settings. Many times the only way to correct a captured image is through post processing. However, post-processing is often time consuming and complex.

One known digital camera analyzes a photographic scene at either a pre capture or post capture stage. This known digital camera is then able to provide suggestions to a user as to the camera control parameter settings required in order to capture an image. Such a camera may also automatically adjust the camera control parameters. However, this known camera is difficult to use during a photo-taking session, as the user is required to constantly interact with the camera and to change the control parameters between shots. As such, photographic moments are often lost whilst an attempt is made to adjust the control parameters of the camera. Furthermore, the analysis of the photographic scene performed by this known camera is complex and consumes additional battery power.

In order to overcome the problems of the above camera, another known digital camera adjusts control parameters automatically based upon external photographic conditions as detected by the camera. This camera then automatically captures multiple images with different control parameter values. However, such a camera takes the photographic creativity away from the user and often the intent of the user is lost. Further, this camera often captures more images than necessary, thereby wasting memory and battery power.

Thus, a need clearly exists for an improved and more efficient digital camera and method for capturing image pixel data representing a scene.

SUMMARY

It is an object of the present invention to substantially overcome, or at least ameliorate, one or more disadvantages of existing arrangements.

According to one aspect of the present invention there is provided an image capturing apparatus for capturing image data representing a scene, said apparatus comprising:

first control parameter determining means for determining one or more first capture and processing parameters based on user input;

second control parameter determining means for determining one or more second capture and processing parameters based on one or more external conditions detected by said apparatus;

comparison means for comparing said first capture and processing parameters with the second capture and processing parameters; and modifying means for modifying said capturing of said image data based on said comparison.

According to another aspect of the present invention there is provided a method of capturing image data representing a scene, said method comprising:

determining one or more first capture and processing parameters based on user input;

determining one or more second capture and processing parameters based on one or more external conditions;

comparing said first capture and processing parameters with the second capture and processing parameters; and modifying capturing of said image data based on said comparison.

According to still another aspect of the present invention there is provided an image capturing apparatus for capturing image data representing a scene, said apparatus comprising:

first control parameter determining means for determining one or more first capture and processing parameters based on user input;

second control parameter determining means for determining one or more second capture and processing parameters based on one or more external conditions detected by said apparatus;

comparison means for comparing said first capture and processing parameters with the second capture and processing parameters;

first capture means for capturing said image data in accordance with said first capture and processing parameters; and second capture means for capturing further image data in accordance with said second capture and processing parameters, if the result of said comparison is greater than a predetermined threshold value.

According to still another aspect of the present invention there is provided an image capturing apparatus for producing images representing a scene, said apparatus comprising:

first control parameter determining means for determining one or more first capture and processing parameters based on user input;

second control parameter determining means for determining one or more second capture and processing parameters based on one or more external conditions detected by said apparatus;

comparison means for comparing said first capture and processing parameters with second capture and processing parameters;

first capture means for capturing said pixel image data in accordance with said first capture and processing parameters;

second capture means for capturing further pixel image data in accordance with said second capture and processing parameters, if the result of said comparison is greater than a predetermined threshold value; and processing means for processing the captured pixel image data and the further captured pixel image data to produce first and second images of said scene.

According to still another aspect of the present invention there is provided an image processing apparatus camera for capturing pixel image data representing a scene, said camera comprising:

first control parameter determining means for determining one or more first capture and processing parameters, including a first white balance value, based on user input;

second control parameter determining means for determining one or more second capture and processing parameters, including a second white balance value, based on one or more external conditions detected by said apparatus;

comparison means for comparing said first and second white balance values; and first modifying means for modifying said capturing of said image data in accordance with said comparison.

According to still another aspect of the present invention there is provided an image capturing apparatus for capturing image data representing a scene, said camera comprising:

first control parameter determining means for determining one or more first capture and processing parameters, including a first white balance value, based on user input;

second control parameter determining means for determining one or more second capture and processing parameters, including a second white balance value, based on one or more external conditions detected by said apparatus;

comparison means for comparing said first and second white balance values;

modifying means for modifying said capturing of said image data in accordance with said comparison; and storage means for storing the captured image data in an unprocessed form, if the result of said comparison is greater than a predetermined threshold value.

According to still another aspect of the present invention there is provided a computer program for capturing image data representing a scene, said program comprising:

code for determining one or more first capture and processing parameters based on user input;

code for determining one or more second capture and processing parameters based on one or more external conditions;

code for comparing said first capture and processing parameters with the second capture and processing parameters; and code for modifying said capturing said image data based on said comparison.

According to still another aspect of the present invention there is provided a computer program product having a computer readable medium having a computer program recorded therein for capturing image data representing a scene, said computer program product comprising:

computer program code means for determining one or more first capture and processing parameters based on user input;

computer program code means for determining one or more second capture and processing parameters based on one or more external conditions;

computer program code means for comparing said first capture and processing parameters with the second capture and processing parameters; and computer program code means for modifying said capturing of said image data based on said comparison.

Other aspects of the invention are also disclosed.

BRIEF DESCRIPTION OF THE DRAWINGS

Some aspects of the prior art and one or more embodiments of the present invention will now be described with reference to the drawings and appendices, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

Methods of capturing image pixel data representing a scene are described below with reference to FIGS. 1 to 5. The described methods may be practiced using a camera 150, such as that shown in FIG. 1 wherein the processes of FIGS. 2 to 4 may be implemented as software, such as an application program executing within the camera 150. In particular, the steps of the described methods are effected by instructions in the software that are carried out by the camera 150. The instructions may be formed as one or more code modules, each for performing one or more particular tasks. The software may also be divided into two separate parts, in which a first part performs the image pixel data capturing methods and a second part manages a user interface between the first part and the user. The software may be stored in a computer readable medium, including the storage devices described below, for example. The software may be loaded into the camera 150 from the computer readable medium, and then executed by the camera 150. A computer readable medium having such software or computer program recorded on it is a computer program product. The use of the computer program product in the camera 150 effects an advantageous apparatus for implementing the described methods.

Figure 1:
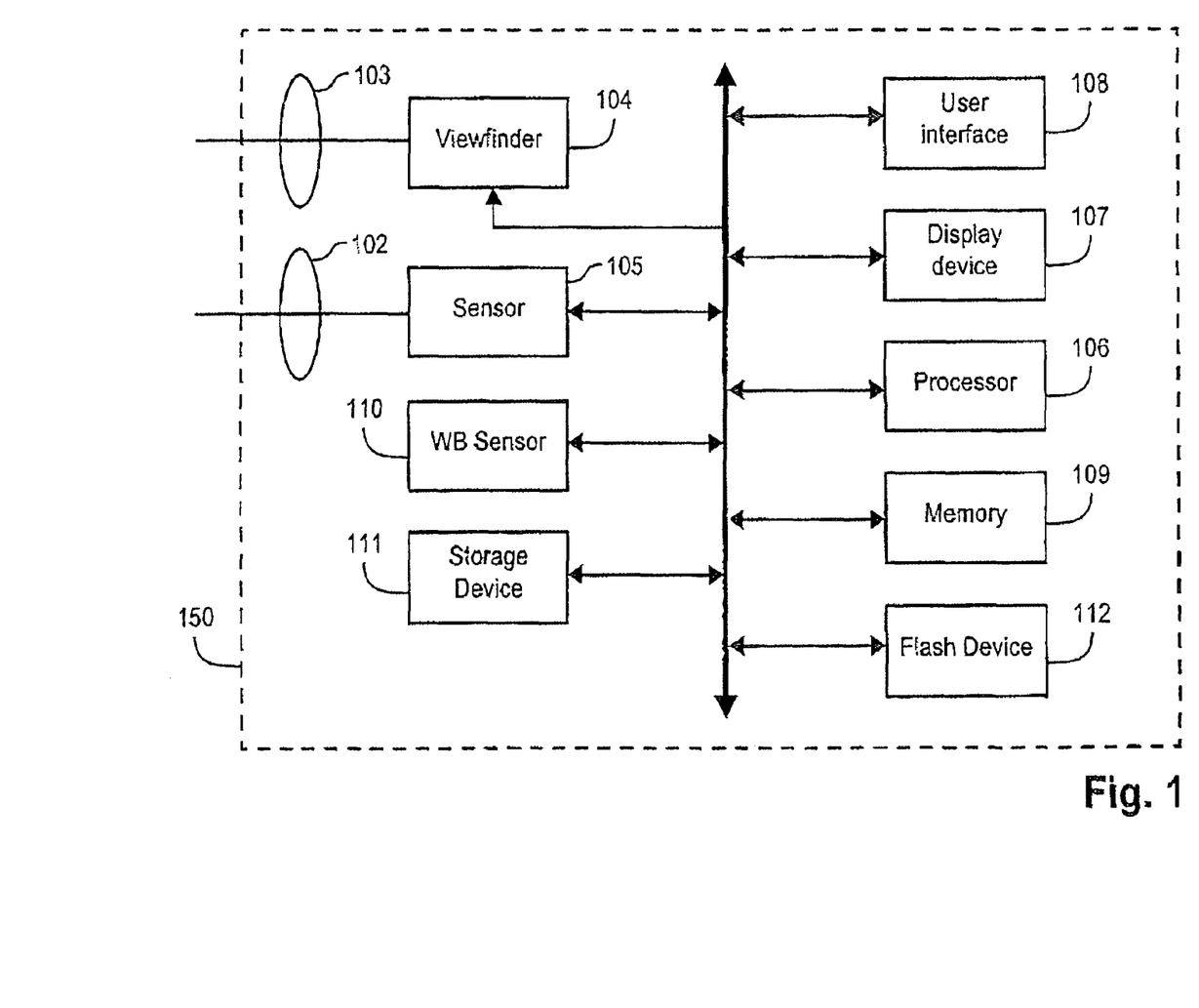
FIG. 1 is a schematic block diagram of a digital camera upon which arrangements described may be practiced.

The digital camera 150 comprises input devices such as an a view finder 104, image sensor 105, a user interface 108 and a white balance (WB) sensor 110, and output devices such as a display device 107 (e.g., Liquid Crystal Display (LCD)) and a flash 112. The digital camera 150 typically includes at least one processor unit 106, and a memory unit 109, for example formed from semiconductor random access memory (RAM) and read only memory (ROM). A hard disk drive or other non-volatile mass storage device 111 may also be provided. Typical examples of such mass storage devices include compact flash (CF) memory and similar branded removable memory. The components 104 to 112 of the camera 150, typically communicate via an interconnected bus 113.

Typically, the application program is resident on the read only memory 109 and is read and controlled in its execution by the processor 106. Intermediate storage of the program may be accomplished using the semiconductor memory 109, possibly in concert with the storage device 111. The application program loaded into the camera 150 may be pre-stored in the in the read only memory 109 via a manufacturer of the camera 150, for example. Alternatively, the application program may be loaded from computer readable media. For example, the application program may be supplied to the user encoded on a CD-ROM or floppy disk and loaded into the camera 150 via a serial link (not shown). The term "computer readable medium" as used herein refers to any storage or transmission medium that participates in providing instructions and/or data to the camera 150 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the camera 150.

The camera 150 also comprises a lens system 102 through which light from a scene to be photographed is optically focused onto the image sensor 105. The image sensor 105 comprises a two-dimensional array of photosensitive elements (not shown), with each photosensitive element recording the intensity of light falling thereon. The recorded light intensity may be used to provide image pixel data representing the photographed scene. The provision of this image pixel data by the image sensor 105 is typically referred to as 'the capture' of image pixel data and the data is typically referred to as 'the captured' image pixel data. The photosensitive elements of the image sensor 105 may be of Charged Coupled Device (CCD) or Complementary Metal Oxide Semiconductor (CMOS) technology. The image pixel data captured by the image sensor 105 is passed to the processor 106. The processor 106 processes the image pixel data and may store the image date in the memory unit 109 or on the storage device 111.

Light from the scene may also be measured by the white balance (WB) sensor 110. The WB sensor 110 determines spectral characteristics of the light from the scene. Typically, these spectral characteristics are determined as a color temperature value.

The viewfinder 104 of the camera 150 allows a user to compose an image of the photographic scene to be captured, with the image being visible through a lens 103. In one implementation, the viewfinder 104 and image sensor 105 may share the same light path. The display device 107 may be controlled by the processor 106 to display a down-sampled version of the captured image pixel data.

The user interface 108 allows the user to control the camera 150, by selecting and setting various control parameters. The settings of the control parameters may be stored as one or more control parameter values in memory 109, for example. The display device 107 may also function as an interface to communicate current control parameters to the user. As described above, such control parameters include image storage format, shutter speed, aperture size, ISO sensitivity, white balance and exposure compensation. The control parameters may also include a noise reduction method, a specific metering mode and selection of an electronic flash.

Camera control parameters such as image storage format, white balance and exposure compensation affect how captured image pixel data is processed at a post-capture stage. Thus, the processor 106 identifies these control parameters as post-capture control parameters.

Camera control parameters such as aperture size, shutter speed, use of a flash, ISO sensitivity and focus length affect the capturing of image pixel data pre-capture. Thus the processor 106 identifies these control parameters as pre-capture control parameters.

The user interface 108 comprises an automatic/manual setting key, a photographing mode setting key, shutter release button, zoom key and cursor key, none of which are shown in FIG. 1. The automatic/manual setting key may be used to set the camera 150 to "automatic" or "manual" for different modes of operation, as will be described in detail below. The shutter release button is a switch capable of distinguishing between a half depression and full depression. At half depression of the shutter release button, the camera 150 may be triggered to perform several operations to prepare for the capturing of pixel image data. Typically, when the automatic/manual setting key of the camera 150 is set to automatic, the processor 106 performs a metering operation to ensure that light from the scene to be photographed will be properly exposed, upon the shutter release button being depressed to half depression. In this instance, the processor 106 also determines shutter speed and aperture size values, and corresponding camera control parameters are set by the camera 150 automatically. When the shutter speed and aperture size have been set by the camera 150, the processor 106 may also invoke the WB sensor 110 to determine a color temperature value. The color temperature value may be used to correct any color bias. If the processor 106 determines that there is not enough light being captured from the scene to be photographed, the processor 106 may choose to invoke a flash 112, as seen in FIG. 1. The camera 150 may also perform an automatic focus process to focus the lens system 102 upon the shutter release button being depressed to half depression. At full depression of the shutter release button, the camera 150 is triggered to capture image pixel data representing the photographic scene according to the camera control parameters.

The photographing mode setting key is a switch for manually changing the photographing mode. For example, the photographic mode may be set to portrait mode, landscape mode, close-up mode, action mode, program mode, aperture priority mode, shutter priority mode and depth of field mode.

The zoom key is a switch for operating the zoom lens 102 in order to set photographing magnification.

The cursor key of the user interface 108 may be used to change the value of various camera control parameters. For example, the cursor key may be used to toggle between different control parameter values under an options menu displayed on the display device 107.

Figure 2:
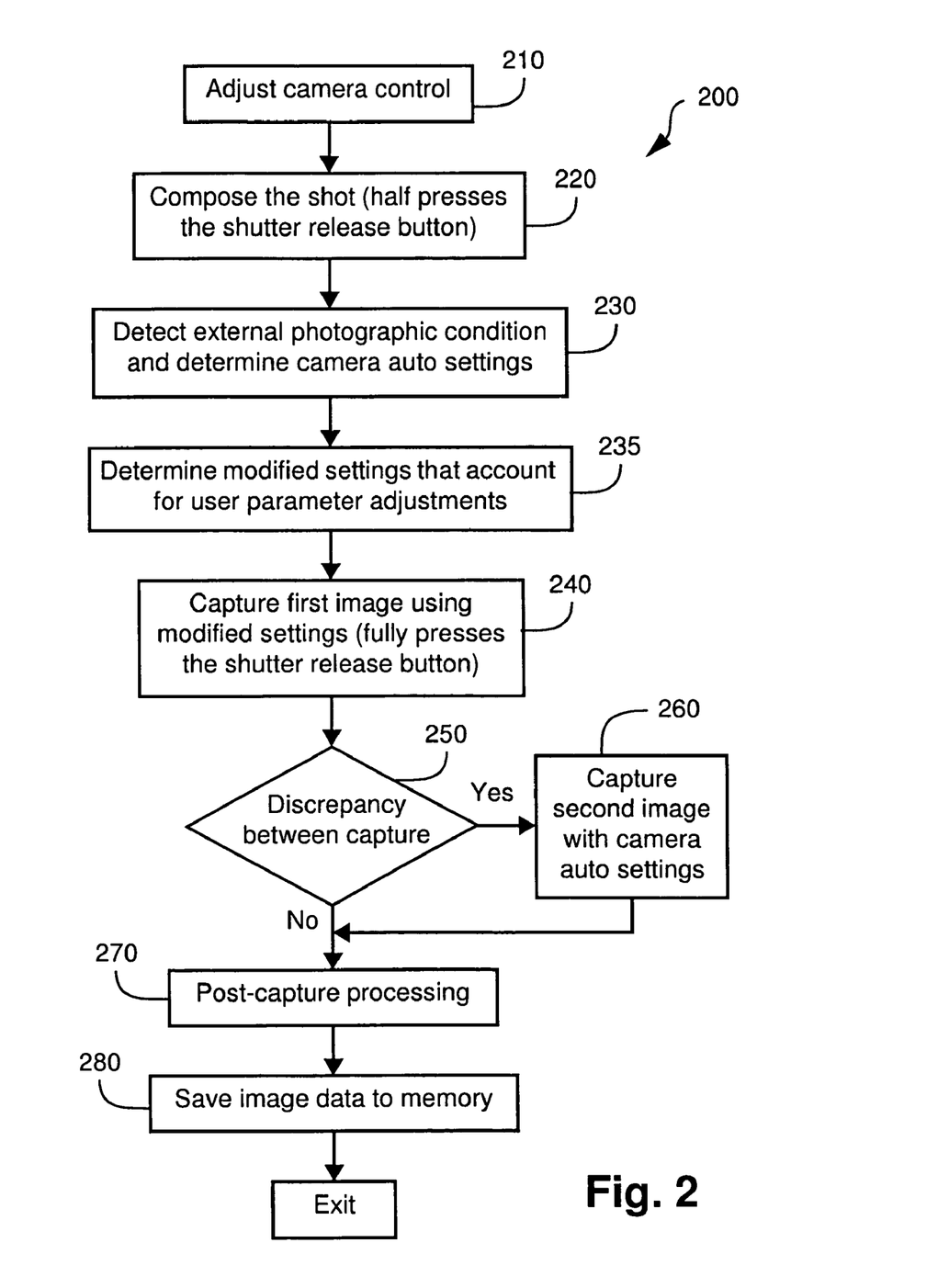
FIG. 2 is a flow diagram showing a method of capturing image pixel data representing a scene.

A method 200 of capturing image pixel data representing a scene, will now be described with reference to FIG. 2. The method 200 may be implemented as software resident on the read only memory 109 and being controlled in its execution by the processor 106.

The method 200 is particularly advantageous where user modification to the camera control parameters leads to a difference between the values of the pre-capture control parameters for the camera 150 when compared to the pre-capture control parameters that the camera 150 would determine in fully automatic mode. As will be explained in detail below, the measured difference may be compared to one or more predetermined threshold values.

The method 200 begins at step 210 where the processor 106 detects that one or more camera control parameters have been adjusted. For example, before controlling the camera 150 to take a photograph of a scene, the user may adjust and select relevant camera control parameters in preparation for capturing image pixel data. The processor 106 stores values for each of the adjusted camera control parameters in memory 109. At the next step 220, the processor detects a half press of the shutter release button. For example, the user may hold the camera 150 in position such that the camera 150 points towards a desired scene. The user may then compose a shot using the ViewFinder 104 and half press the shutter release button on the user interface 108. In response to the detection of the shutter release button being half pressed, at the next step 230, the processor 106 may perform various operations and set various camera control parameters. Such operations may include detecting conditions external to the camera 150 at the scene for exposure metering, determining a white balance to remove color bias in the scene, and auto focusing the lens 102 to make sure the photographic scene or a subject of the scene is in focus. Based on the detected external conditions, the processor 106 determines a best set of control parameter values for the capturing pixel image data representing the scene.

At the next step 235, the processor 106 determines a second set of control parameter values for the camera 150 based on the camera control parameters adjusted at step 210. For example, in an aperture priority mode if the user has adjusted a single control parameter, then processor 106 determines values for control parameters related to the adjusted parameter in order to achieve a desired exposure level.

At the next step 240, upon detecting that the shutter release button is fully depressed, the processor 106 captures pixel image data representing a first image of the scene based on the intensity of light falling on each of the photosensitive elements of the image sensor 105. The image pixel data is determined at step 240 based on the camera control parameters determined at step 235.

At the next step 250, if the processor 106 determines that the difference between the values of the control parameters determined at steps 230 and 235, is above one or more predetermined thresholds, then the method 200 proceeds to step 260. Otherwise, the method 200 proceeds to step 270. The predetermined thresholds will be explained in more detail below. A system 500 for determining the difference between the values of the control parameters determined at steps 230 and 235, as executed at step 250, will be described below with reference to FIG. 5.

At step 260, the processor 106 captures further pixel image data representing a second image of the scene based on the intensity of light falling on each of the photosensitive elements of the image sensor 105 and the camera control parameters determined by the processor at step 230.

The method continues at step 270 where the processor 106 performs any post-capture processing on the first and second images captured at steps 240 and step 260, respectively. The post-processing may include noise reduction, image sharpening, white balancing and data compression. The post-processing may also include performing a reverse mosaic process on the image data captured at steps 240 and 260. The method 200 concludes at the next step 280, where the captured image pixel data representing the first and second images is stored in memory 109 or to the storage device 111. The image pixel data may be stored in a compressed format.

Figure 3:
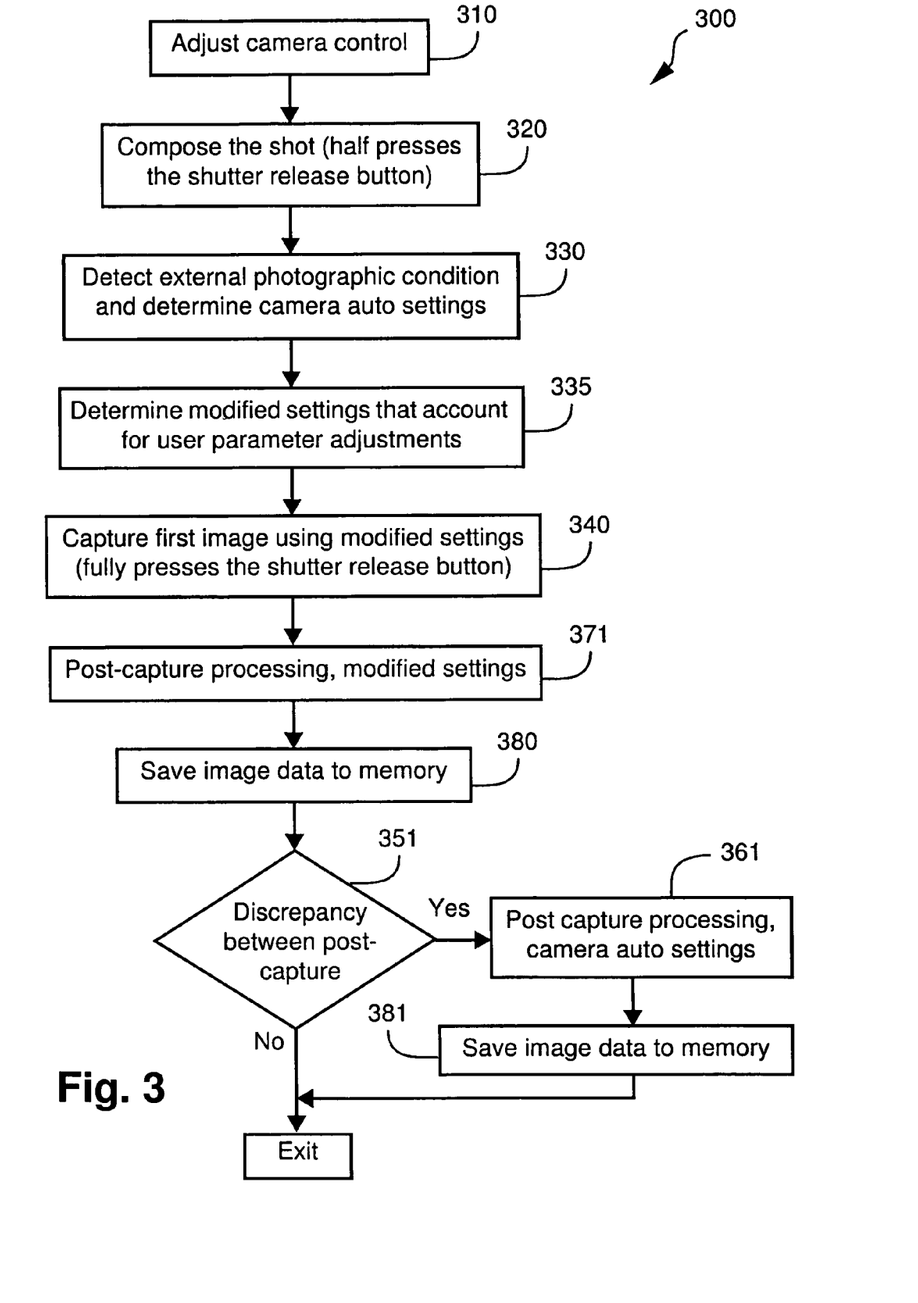
FIG. 3 is a flow diagram showing a further method of capturing image pixel data representing a scene.

A further method 300 of capturing image pixel data representing a scene, will now be described with reference to FIG. 3. The method 300 may be implemented as software resident on the read only memory 109 and being controlled in its execution by the processor 106.

The method 300 is particularly advantageous where there is a difference between the values of post-capture image processing parameters as determined automatically by the camera 150 and the control parameters specified manually by the user. Typically these post-capture image processing parameters may include white balance, compression quality and stored image size, for example.

The method 300 begins at step 310 where the processor 106 detects that one or more camera control parameters have been adjusted. For example, before controlling the camera 150 to take a photograph of a scene, the user may adjust and select relevant camera control parameters for the image pixel data capturing process. The processor 106 stores values for each of the adjusted camera control parameters in memory 109. At the next step 320, the processor 106 detects a half press of the shutter release button. For example, the user may hold the camera 150 in position such that the camera 150 points towards a desired scene. The user may then compose a shot and half press the shutter release button on the user interface 108. In response to the detection of the shutter release button being half pressed, at the next step 330, the processor 106 performs various operations and sets various camera control parameters according to user specified instructions. Such operations may include detecting conditions external to the camera 150 at the scene for exposure metering, determining a white balance to remove color bias in the scene, and auto focusing the lens 102 to make sure the scene or a subject of the scene is in focus. Based on the detected external conditions, the processor 106 determines a best set of control parameter values for the scene in a similar manner to that when the camera is in "automatic" mode, as described above.

At the next step 335, the processor 106 determines a second set of control parameter values for the camera 150 based on the camera control parameters adjusted at step 310. For example, in an aperture priority mode, if the user has adjusted a single control parameter, then the processor 106 determines values for control parameters related to the adjusted parameter in order to achieve a desired exposure level.

At the next step 340, upon detecting that the shutter release button is fully depressed, the processor 106 captures pixel image data representing a first image of the scene based on the intensity of light falling on each of the photosensitive elements of the image sensor 105. The pixel image data is captured based on the camera control parameters determined at step 335.

Then at the next step 371, the processor 106 performs any post-capture processing on the first image captured at step 340, according to the control parameters determined at step 335. Again, the post-processing may include noise reduction, image sharpening, white balancing and data compression. The post-processing may also include performing a reverse mosaic process on the image data captured at step 340. The method 300 continues at the next step 380, where the captured image pixel data representing the first image is stored in memory 109. The image pixel data may be stored in a compressed format.

At the next step 351, if the processor 106 determines that the difference between the values of the control parameters determined at step 335 and the control parameters used in the post-processing at step 371, is above one or more predetermined thresholds, then the method 300 proceeds to step 361. Otherwise, the method 300 concludes.

At step 361, the processor 106 performs post-capture processing on the first image captured at step 340, according to the control parameters determined at step 330 in order to determine a second image representing the scene. Then at the next step 381, image pixel data representing the second image is stored in memory 109. The image pixel data may be stored in a compressed format at step 381.

Figure 4:
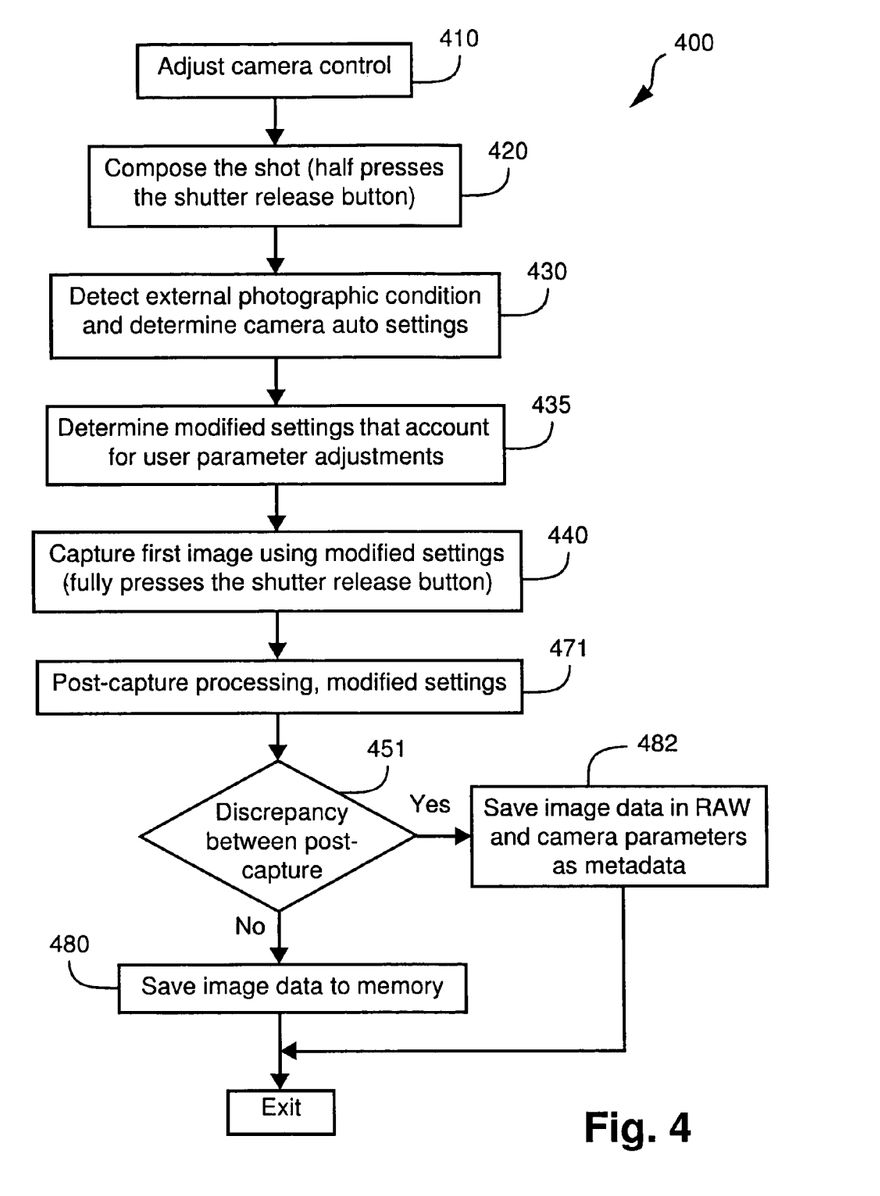
FIG. 4 is a flow diagram showing a still further method of capturing image pixel data representing a scene.

A further method 400 of capturing image pixel data representing a scene will now be described with reference to FIG. 4. The method 400 may be implemented as software resident on the read only memory 109 and being controlled in its execution by the processor 106.

Again, the method 400 is particularly advantageous where there is a difference between the values of post-capture image processing parameters as determined automatically by the camera 150 and the control parameters specified manually by the user.

The method 400 begins at step 410 where the processor 106 detects that one or more camera control parameters have been adjusted. For example, before controlling the camera 150 to take a photograph of a scene, the user may adjust and select relevant camera control parameters for the image pixel data capturing process. The processor 106 stores values for each of the adjusted camera control parameters in memory 109. At the next step 420, the processor 106 detects a half press of the shutter release button. For example, the user may hold the camera 150 in position such that the camera 150 points towards a desired scene. The user may then compose a shot and half press the shutter release button on the user interface 108. In response to the detection of the shutter release button being half pressed, at the next step 430, the processor 106 may perform various operations and set various camera control parameters. Such operations may include detecting conditions external to the camera 150 at the scene for exposure metering, determining a white balance to remove color bias in the scene, and auto focusing the lens 102 to make sure the photographic scene or a subject of the scene is in focus. Based on the detected external conditions, the processor 106 determines a best set of control parameter values for the scene.

At the next step 435, the processor 106 determines a second set of control parameter values for the camera 150 based on the camera control parameters adjusted at step 410. For example, in an aperture priority mode, if the user has adjusted a single control parameter, then the processor 106 determines values for control parameters related to the adjusted parameter in order to achieve a desired exposure level.

At the next step 440, in response to detecting that the shutter release button is fully depressed, the processor 106 captures pixel image data representing a first image of the scene based on the intensity of light falling on each of the photosensitive elements of the image sensor 105 and the camera control parameters determined at step 435.

Then at the next step 471, the processor 106 performs any post-capture processing on the first image captured at step 440, according to the control parameters determined at step 435. Again, the post-processing may include noise reduction, image sharpening, white balancing and data compression. The post-processing may also include performing a reverse mosaic process on the image data captured at step 440.

At the next step 451, if the processor 106 determines that the difference between the values of the control parameters determined at step 435 and the control parameter used in the post-processing at step 471, is above one or more predetermined thresholds, then the method 400 proceeds to step 482. Otherwise, the method 400 proceeds to step 480.

At step 482, pixel image data captured at step 440 is stored in memory 109, together with the control parameters determined at step 435, in accordance with a camera raw format. Camera raw formats store pixel image data without loss as the pixel image data is read off the photosensitive elements of the image sensor 105. Post-processing may be performed on the captured pixel image data at a later time. However, storing the pixel image data in a camera raw format consumes more memory.

In one implementation, the control parameters determined at steps 430 and 435 may be stored together with the captured camera raw format data, as an additional piece of metadata. Any subsequent processing performed on the camera raw data stored in memory at step 482 can provide an image determined in accordance with the camera control parameters determined at step 435 and/or an image determined in accordance with the camera control parameters determined at step 430.

In a second implementation, only the control parameters determined at steps 435 may be stored together with the captured camera raw format data. In this instance, the user has full control over any subsequent processing performed on the camera raw data stored in memory at step 482, for example.

At the step 480, image pixel data representing the first image is stored in memory 109. The image pixel data may be stored in a compressed format at step 480.

Figure 5:
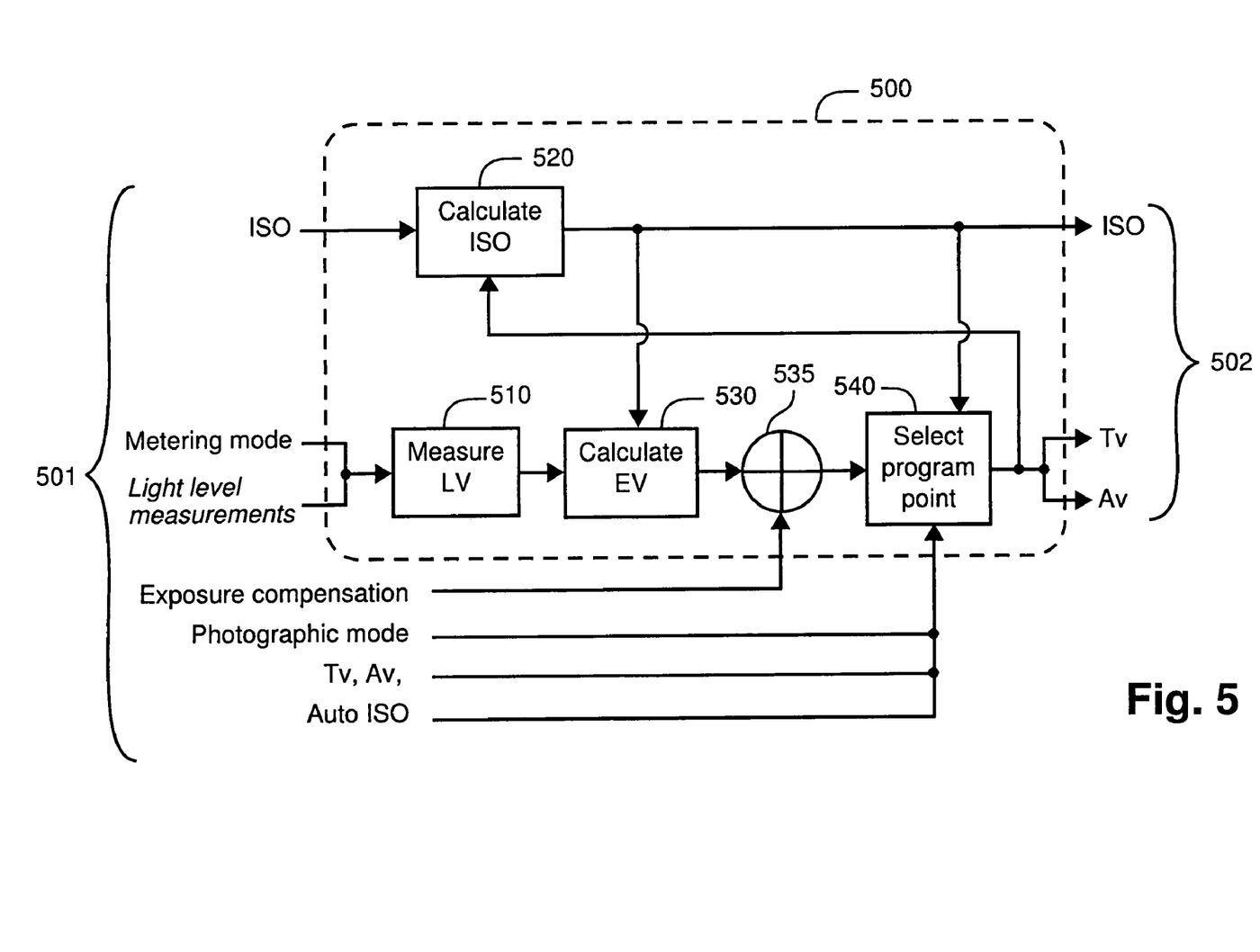
FIG. 5 shows a system for determining a difference value representing the difference between the values of control parameters.

A system 500 for determining the difference between the values of the control parameters determined at steps 230 and 235, as executed at step 250, will now be described with reference to FIG. 5. The control parameters that are compared at step 250 include those parameters relating to exposure and focus.

Most conventional digital cameras include a number of user adjustable control parameters, which affect the exposure level that the camera will apply to image data. These user adjustable control parameters include selection of a metering area (e.g., spot, frame average, or centre weighting), ISO setting, exposure compensation, manual selection of shutter speed to a level that cannot be fully compensated by an aperture adjustment, similar adjustment to aperture and selection of photographic mode (e.g., portrait, landscape, action or slow sync flash). The system 500 may be used to determine Light Value (LV) and Exposure Value (EV) resulting from each of the automatic and user selectable parameter settings.

As described herein, metering may be performed by taking a linear combination of the light metered for the whole of a scene and the light measured in a focus area. As seen in FIG. 5, the system 500 determines the camera settings 502 of shutter speed Tv, aperture Av and sensitivity ISO from control parameters and measurements 501 that are input to the camera 150. Specifically, light is measured over a number of points in the scene. A Measure LV device 510 combines these light measurements according to a metering mode (e.g., centre weighted, spot or scene averaged) to determine a measured LV value. The metering mode input to the Measure LV device 510 may be a function of the photographic mode. The ISO sensitivity is determined by a Calculate ISO device 520 and is input to a Calculate EV device 530 together with the measured LV value. The Calculate EV device 530 determines an EV from the ISO sensitivity and the measured LV value. An exposure compensation value is then applied to the determined EV value at a point 535 before being input to a select program point device 540. The select program point device 540 selects a program point (i.e., shutter speed and aperture combination) to achieve the required EV.

The select program point device 540 selects a program point in accordance with a current photographic mode. In particular, the photographic mode may place boundaries on the range of values that can be used for aperture or shutter speed. Within this allowed range of values the photographic mode may bias the possible choice of values either towards a high shutter speed (e.g., in action photography mode) or wide aperture (e.g., in portrait mode). If the camera 150 is set to use an automatic ISO setting and the ISO is not set to a maximum value, then the values for Tv and Av determined by the select program device 540 may be set so as not to achieve the requested EV. In this instance, a value representing the difference in EV is fed back to the Calculate ISO device 520 and the ISO sensitivity is adjusted in order to achieve the required EV. As an example, the EV at an ISO speed value of one hundred (100) may be obtained using the following relationship:

$$EV = \log_2\left(\frac{Av^2}{Tv}\right) \quad (1)$$

where Av represents an f number of the aperture (i.e., focal length divided by the aperture value) and Tv represents the shutter speed. A halving of the film ISO speed decreases the EV by one (1) and a doubling of film ISO speed increases the EV by one (1).

At step 250 of the method 200, the values for LV output from the Measure LV device 510, the EV input to 540 and the ISO output from 520 are compared for camera determined control parameters and user selected control parameters input at the inputs 501. Table 1 describes tests that the system performs at step 250. A predetermined threshold value, $T_{exp}$, measured in exposure stops is set to a default value of one (1). The threshold value, $T_{exp}$, may be adjusted up or down in one-third (⅓) stop increments using the user interface 108. If any of the tests shown in Table 1 return true then the method 200 proceeds to step 260, where the processor 106 captures further pixel image data representing a second image of the scene based on the intensity of light falling on each of the photosensitive elements of the image sensor 105 and the camera control parameters determined by the processor at step 230.

TABLE 1

| Parameter | Test |
|---|---|
| LV | $|LV_{camera} - LV_{user}| > T_{exp}$ |
| EV | $|EV_{camera} - EV_{user}| > T_{exp}$ |
| ISO | $|\log_2(ISO_{camera}/ISO_{user})| > T_{exp}$ |

The other pre-capture control parameter that may trigger capture of further pixel image data representing a second image, is focus. A contrast based auto-focus system that uses a hill-climbing algorithm for selection of an optimal focus point may be used. Such an auto-focus system operates by measuring, for each frame of an image visible in the viewfinder 104, the contrast or magnitude of high frequency information in a predetermined focus region. Focus distance of the lens system 102 is oscillated slightly about a current focus point and a corresponding change in contrast noted. The current focus point is continuously adjusted in a direction that produces increased contrast. An optical focus point is achieved when no increase in contrast is observed with slight oscillation of focus distance either side of the current focus point.

A manual focus option may be provided on the camera 150. During manual focusing an image visible in the viewfinder 104 is monitored and contrast is measured in a predetermined focus region. Each time the focus point for the image is incrementally changed as the result of a manual focus adjustment (i.e., an adjustment of the lens 102) the contrast is measured in the focus region and the focus distance corresponding to the maximum contrast is stored in memory 109 as a value, $F_{camera}$. If a final manual focus setting, $F_{user}$, results in a lower contrast score than was achieved at the focus distance, $F_{camera}$, and the difference between the contrast scores exceeds a predetermined threshold, then the method 200 proceeds to step to step 260, where the processor 106 captures further pixel image data representing a second image of the scene, as described above. The contrast score predetermined threshold value is determined by the standard deviation of contrast measurements taken for the focus region over multiple frames of an image seen in the viewfinder 104 when no modification to the focus distance is made. A default value for the contrast score predetermined threshold value is the value of the standard deviation. However, the contrast score predetermined threshold value may be adjusted up or down in one-third (⅓) increments using the user interface 108.

As described above, at step 351 of the method 300 and at step 451 of the method 400, the processor 106 determines the difference between the values of the control parameters automatically determined by the processor 106 and the values of the control parameters determined based on the camera control parameters adjusted by the user. In particular, the processor 106 determines the difference between the white balance automatically determined by the processor 106 and the white balance determined based on the adjustments made by the user, at steps 351 and 451. These steps will now be described in detail.

As described above, the camera 150 comprises a WB sensor 110 for measuring spectral characteristics of the lighting at a scene. The spectral characteristics determined by the WB sensor 110 is read by the processor 106 in the form of a color temperature measured in degrees Kelvin. The camera 150 may also comprise manually selectable white balance modes. Each of these manually selectable white balance modes comprises an associated color temperature. The color temperature corresponds to a best approximation of the spectral characteristic associated with the corresponding white balance mode. The color temperature may be expanded to a spectrum according to a black body model. For example, a "fluorescent" setting may be assigned a color temperature of approximately 5000° K and an "incandescent" setting may be assigned a color temperature of approximately 3200° K.

At steps 351 and 451, the difference between a measured color temperature and the color temperature corresponding to a manually selected white balance is compared to a predetermined threshold value, $T_{wb}$. For example, a threshold value, $T_{wb}$, of five hundred (500) may be used. If a difference of greater than the threshold value, $T_{wb}$, is determined at steps 351 and 451, then the method 300 and 400 will proceed to steps 361 and 482, respectively, as described above. Again the threshold value, $T_{wb}$, may be adjusted up or down using the user interface 108.

In one implementation, rather than determining the white balance using the WB sensor 110, the white balance may be determined using a post capture image processing method. One such method is known as the "grey-world" algorithm. The grey-world algorithm determines average values for red, green and blue color channels of captured pixel image data and adjusts the red, green and blue color channels so that all channels have roughly equal contributions. Specifically, if the average of the red, green and blue color channels is represented as $R_{wb}$, $G_{wb}$ and $B_{wb}$, then the grey world algorithm scales the color channels until the ratios $R_{wb}/G_{wb}$ and $B_{wb}/G_{wb}$ are both approximately equal to one (1). Using the grey world algorithm, steps 351 and 451 of the methods 300 and 400, respectively, may be implemented by comparing the difference in the grey world color ratios (i.e., $R_{wb}/G_{wb}$ and $B_{wb}/G_{wb}$) determined from data after application of a user specified white balance technique and ideal grey world color ratios values that the grey world algorithm attempts to match. Again a difference that is over a predetermined algorithm specific threshold, at steps 351 and 451, results in the methods 300 and 400 proceeding to steps 361 and 483, respectively.

In one implementation, a single sensitivity control parameter may be used to adjust each of the predetermined thresholds described above (e.g., $T_{exp}$, $T_{wb}$, the contrast threshold and the algorithm specific threshold) by an appropriate amount. These thresholds may be adjusted at the same time.

The methods 300, 400 and 500 will now be described by way of an example. In a first example, a user of the camera 150 decides to take several photographs of a subject outdoors on a sunny day. Prior to taking any photographs the user sets up the camera 150, via the user interface 108, for various camera control parameters, as at step 210 of the method 200. In the example, the user selects no exposure compensation and the image storage format as JPEG. The user also sets the white balance to "sunlight", the focus mode to auto and the ISO sensitivity to two hundred (200). The user also sets the flash to off and the automatic/manual setting key to automatic. The user composes a shot by pointing the camera 150 at a scene and half presses the shutter release button for focusing, as at step 220 of the method 200. The processor 106 senses that the shutter release button is half depressed and controls the camera 150 to perform several operations to prepare for the photo-capture process including detecting the external photographing condition and auto-focusing, as at step 230.

In the example, based on the detection of the external photographing conditions, the processor 106 determines that a shutter speed of $1/100^{th}$ sec and an aperture of F8 will produce a properly exposed image of the scene. The processor 106 therefore sets the corresponding camera control parameters to these values, as at step 230 of the method 200. The processor 106 then determines that no backup is needed. That is, the processor 106 determines that there is no difference between the values of the control parameters determined by the processor 106 based on the detected external conditions and the values of the control parameters determined by the processor 106 based on the various control parameters set by the user.

The user fully presses the shutter release button and the processor 106 captures pixel image data representing a first image of the scene based on the intensity of light falling on each of the photosensitive elements of the image sensor 105 and the camera control parameters set by the processor 106.

In this example, the user proceeds to capture a plurality of photographs in the same external photographing condition until the photo taking session is concluded.

Continuing the example, for the next phototaking session, the user is indoors in an incandescently lit environment. Unfortunately the user forgets to readjust the white balance to "incandescent" and proceeds to photograph with the same camera control parameters as above for the outdoor "sunny day" photo session. When the user half presses the shutter release button, the processor 106 determines that a shutter speed and aperture of $1/30^{th}$ sec and F2.0 combination is needed based on the detection of the external photographing condition. The processor 106 therefore sets the corresponding camera control parameters to these values. In addition a white balance correction value $wb_{camera}$ is also determined by the processor 106 since the correct value for the camera control parameter white balance should be "incandescent" instead of "sunlight". The processor 106 then determines that a backup image is needed. The user fully presses the shutter release button and the processor 106 captures pixel image data representing a first image of the scene according to the user specified camera control parameters. The processor 106 then changes the image storage format from JPEG to RAW, for example, where the camera determined control parameter ($wb_{camera}$) is stored in memory 109 as metadata information together with the RAW data, as at step 482 of the method 400.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequentially.

The foregoing describes only some embodiments of the present invention, and modifications and/or changes can be made thereto without departing from the scope and spirit of the invention, the embodiments being illustrative and not restrictive. For example, each of the methods 200, 300 and 400, described above may be implemented as software resident on the storage device 111 and being controlled in their execution by the processor 106. In this instance, steps 361 and 482 of the methods 300 and 400, respectively, are not required to be executed, if both the pre-capture and post-capture control parameters are different.

Further, the methods 200, 300 and 400 have been described above with reference to a digital camera. However, the methods 200, 300 and 400 may be implemented on any other image processing apparatus, such as a general-purpose computer system, a printer, a mobile phone with image processing capabilities or similar apparatus.

The claims defining the invention are as follows:

1. An image capturing apparatus for capturing image data representing a scene, said apparatus comprising:
   first control parameter determining means for determining a first white balance parameter based on user input;
   second control parameter determining means for determining a second white balance parameter based on an external condition detected by said apparatus;
   determining means for determining a difference between a first white balance parameter based on the user input and a second white balance parameter based on the external condition; and
   modifying means for modifying a process of said image capturing apparatus in accordance with the determined difference.

2. The apparatus according to claim 1, wherein said modifying means modifies the process to capture further image data representing the scene if the determined difference is greater than a predetermined threshold value, the image data being captured in accordance with the first white balance parameter and the further image data being captured in accordance with the second white balance parameter.

3. The apparatus according to claim 1, further comprising memory means for storing the captured image data in an unprocessed format together with the first white balance parameter and the second white balance parameter.

4. The apparatus according to claim 1, wherein the difference is determined by determining the difference of a light value.

5. The apparatus according to claim 1, wherein the difference is determined by determining the difference of an exposure value.

6. The apparatus according to claim 1, wherein said apparatus is a camera.

7. The apparatus according to claim 1, wherein said apparatus is a mobile phone.

8. The apparatus according to claim 1, wherein said apparatus is a general purpose computer.

9. A method of capturing image data representing a scene, said method comprising:
   determining a first white balance parameter based on user input;
   determining a second white balance parameter based on an external condition;
   determining a difference between a first white balance parameter based on the user input and a second white balance parameter based on an external condition; and
   modifying a process of capturing of the image data in accordance with the determined difference.

10. The method according to claim 9, further comprising the step of modifying the process to capture further image data representing the scene if the determined difference is greater than a predetermined threshold value, the image data being captured in accordance with the first white balance parameter and the further image data being captured in accordance with the second white balance parameter.

11. The method according to claim 9, further comprising storing the captured image data in an unprocessed format together with the first white balance parameter and the second white balance parameter.

12. The method according to claim 9, wherein the difference is determined by determining the difference of a light value.

13. The method according to claim 9, wherein the difference is determined by determining the difference of an exposure value.

14. An image capturing apparatus for capturing image data representing a scene, said apparatus comprising:
   first control parameter determining means for determining one or more first capture and processing parameters based on user input;
   second control parameter determining means for determining one or more second capture and processing parameters based on one or more external conditions detected by said apparatus;
   determining means for determining a difference between white balance determined in accordance with the first capture and processing parameters and white balance determined in accordance with the second capture and processing parameters;
   first capture means for capturing the image data in accordance with the first capture and processing parameters; and
   second capture means for capturing further image data in accordance with the second capture and processing parameters, if the determined difference is greater than a predetermined threshold value.

15. The apparatus according to claim 14, further comprising processing means for processing the captured pixel image data and the further captured pixel image data.

16. An image capturing apparatus for producing images representing a scene, said apparatus comprising:
   first control parameter determining means for determining one or more first capture and processing parameters based on user input;
   second control parameter determining means for determining one or more second capture and processing parameters based on one or more external conditions detected by said apparatus;
   determining means for determining a difference between white balance determined in accordance with the first capture and processing parameters and white balance determined in accordance with second capture and processing parameters;
   first capture means for capturing pixel image data in accordance with the first capture and processing parameters;
   second capture means for capturing further pixel image data in accordance with the second capture and processing parameters, if the determined difference is greater than a predetermined threshold value; and
   processing means for processing the captured pixel image data and the further captured pixel image data to produce first and second images of the scene.

17. An image capturing apparatus for capturing pixel image data representing a scene, said apparatus comprising:
   first control parameter determining means for determining one or more first capture and processing parameters, including a first white balance value, based on user input;
   second control parameter determining means for determining one or more second capture and processing parameters, including a second white balance value, based on one or more external conditions detected by said apparatus;
   comparison means for comparing the first and second white balance values; and
   modifying means for modifying the capturing of the image data in accordance with the comparison.

18. An image capturing apparatus for capturing image data representing a scene, said apparatus comprising:
   first control parameter determining means for determining one or more first capture and processing parameters, including a first white balance value, based on user input;
   second control parameter determining means for determining one or more second capture and processing parameters, including a second white balance value, based on one or more external conditions detected by said apparatus;
   comparison means for comparing the first and second white balance values;
   modifying means for modifying the capturing of the image data in accordance with the comparison; and
   storage means for storing the captured image data in an unprocessed form, if the result of the comparison is greater than a predetermined threshold value.

19. A computer program stored on a computer readable medium for capturing image data representing a scene, said program comprising:
   code for determining one or more first capture and processing parameters based on user input;

code for determining one or more second capture and processing parameters based on one or more external conditions;

code for determining a difference between white balance determined in accordance with the first capture and processing parameters and white balance determined in accordance with the second capture and processing parameters; and code for modifying the capturing of the image data based on the determined difference.

20. A computer program product having a computer readable medium having a computer program recorded therein for capturing image data representing a scene, said computer program product comprising:

computer program code means for determining one or more first capture and processing parameters based on user input;

computer program code means for determining one or more second capture and processing parameters based on one or more external conditions;

computer program code means for determining a difference between white balance determined in accordance with the first capture and processing parameters and white balance determined in accordance with the second capture and processing parameters; and computer program code means for modifying the capturing of the image data based on the comparison.

21. A mobile phone for capturing image data representing a scene, said mobile phone comprising:

first control parameter determining means for determining one or more first capture and processing parameters based on user input;

second control parameter determining means for determining one or more second capture and processing parameters based on one or more external conditions detected by siad mobile phone;

comparison means for comparing the firt capture and processing parameters with the second capture and processing parameters; and modifying means for modifying the capturing of the image data based on the comparison.

* * * * *